United States Patent [19]

Chen

[11] Patent Number: 5,059,324

[45] Date of Patent: Oct. 22, 1991

[54] CENTRIFUGAL PULP SCREEN

[76] Inventor: Tzau-Ha Chen, No. 3, Pei-Shan Chuang, Fu-Chu Tsun, Ta-Aa Hsiang, Taichung Hsien, Taiwan

[21] Appl. No.: 612,971

[22] Filed: Nov. 15, 1990

[51] Int. Cl.⁵ .................................................. B07B 1/20
[52] U.S. Cl. .................................. 210/413; 209/273; 209/397; 210/498
[58] Field of Search ................... 162/55; 209/273, 397; 210/413, 498

[56] References Cited

U.S. PATENT DOCUMENTS

| | | | |
|---|---|---|---|
| 3,713,541 | 1/1973 | Nelson | 209/273 |
| 4,717,471 | 1/1988 | Winkler | 209/273 |
| 4,776,957 | 10/1988 | Lampenius et al. | 209/273 |

Primary Examiner—Ivars Cintins
Attorney, Agent, or Firm—Birch, Stewart, Kolasch & Birch

[57] ABSTRACT

A cylindrical screen member of a centrifugal pulp screen used in paper manufacturing is disclosed. The pulp is agitated and impelled to pass through a plurality of parallel radial through-holes of the screen member by the centrifugal force imparted by a rotor. Each through-hole of the screen member has a cross-section elongated in a direction transverse to a horizontal line and inclined at an angle with respect to a vertical line. The pulp particles can linearly pass through the through-holes and flow out through the screen member smoothly. Therefore, the likelihood of blockage is reduced, and the power necessary to drive the rotor is economized.

2 Claims, 5 Drawing Sheets

CENTRIFUGAL PULP SCREEN

BACKGROUND OF THE INVENTION

This invention relates to a centrifugal pulp screen used in paper manufacturing and particularly to the construction of a cylindrical screen member of the centrifugal pulp screen.

In order to get homogeneous pulp in paper manufacturing, the impurities in the pulp must be removed, usually by sifting the pulp through a series of screening processes in various screening machines. Referring to FIG. 1, pulp flows through a pulp screening machine (1) in a direction indicated by the arrows. A rotor (2) is located at a center of the screening machine. The bottom end of the rotor extends through the bottom of the screening machine (1) and is attached to a band wheel (3) to be driven by a motor (not shown). Two support plates (4) (4') are provided in the screening machine to mount a cylindrical screen member (5) therebetween, so that the screen member (5) surrounds the rotor (2). The support plate (4) defines by partition two spaces which respectively receive the inflow and the efflux of the pulp. Referring to FIGS. 2 and 2A, there are a plurality of axially elongated parallel radial through-holes (6) in the cylindrical screen member (5). Each of the through-holes has an inlet (6') on the inside of the screen member and an outlet (6") on the outside of the screen member for the pulp particles to flow through. When the pulp is agitated and forced by the rotor to flow through the screen member, the through-holes are liable to be come clogged. The pulp disposal efficiency of the screen member is decreased and the efficiency of the motor is reduced, when this situation occurs.

SUMMARY OF THE INVENTION

The main object of this invention is to provide a cylindrical screen member with a plurality of parallel radial through-holes through which the pulp particles can linearly pass and flow smoothly. So the probability of blocking is decreased and the flux of the pulp is increased.

Accordingly, a centrifugal pulp screen of this invention includes a vertical rotor and a cylindrical screen member disposed around the rotor. The cylindrical screen member has a plurality of parallel radial through-holes and the rotor agitates and forces the pulp particles to pass through the through-holes. Each of the through-holes has a cross-section elongated in a direction transverse to a horizontal line and inclined at an angle with respect to a vertical line. Each through-hole still has a lower end and an upper end, the lower end leads the upper end with respect to the rotating direction of the rotor. The pulp particles can linearly pass through such through-holes and flow through smoothly. So the probability of blocking is decreased, the flux of the pulp is increased, and the power necessary to drive the motor is economized.

BRIEF DESCRIPTION OF THE DRAWINGS

Other features and advantages of this invention will become apparent in the following detailed description of the preferred embodiments with reference to the accompanying drawings, in which.

DETAILED DESCRIPTION OF THE PREFERRED EMBODIMENT

Figure 3A:
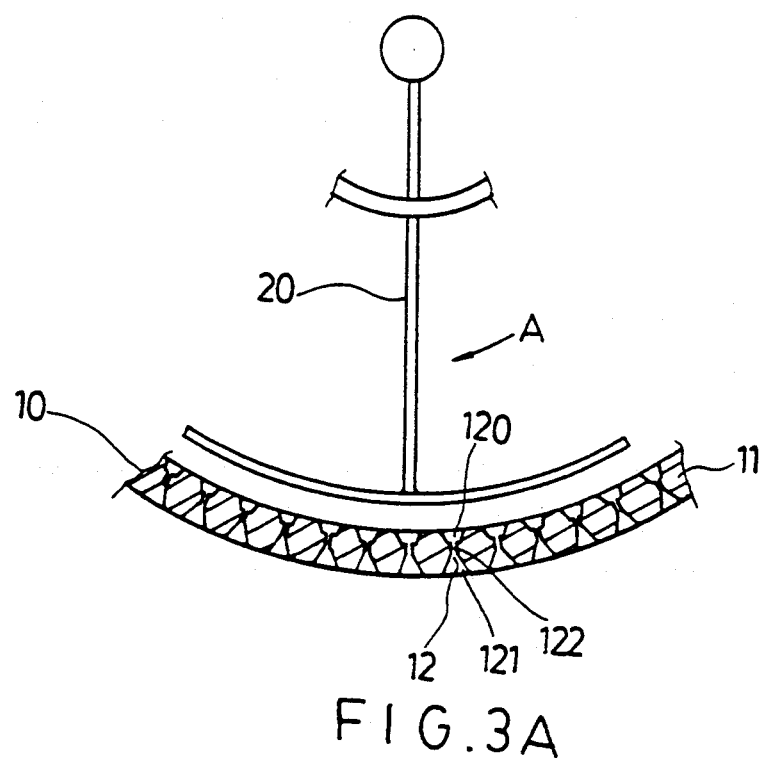
FIG. 3A is a cross-sectional view of the preferred embodiment in FIG. 3.
Figure 3:
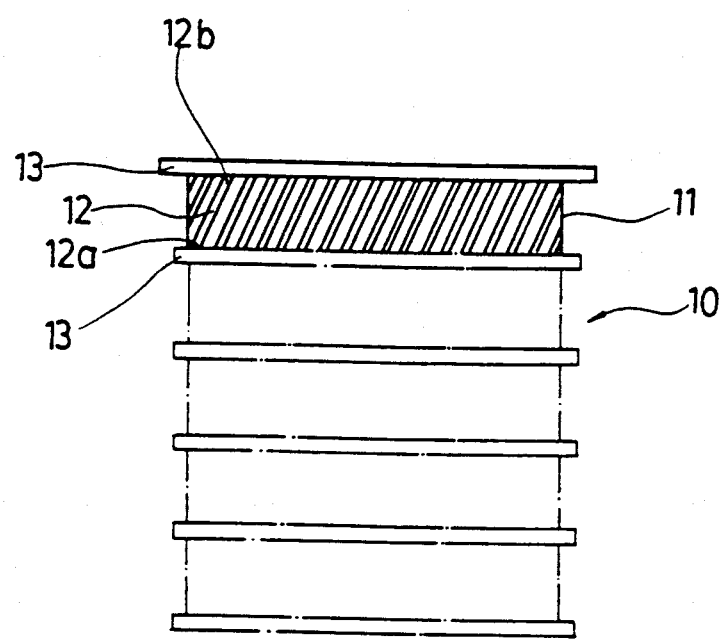
FIG. 3 is a sectional plan view of the preferred embodiment.

Referring to FIGS. 3 and 3A, according to this invention, a centrifugal pulp screen includes a vertical rotor (20) and a cylindrical screen member (10) disposed around the rotor. The cylindrical screen member (10) comprises perforated plates (11) and support ring members (13).

Figure 1:
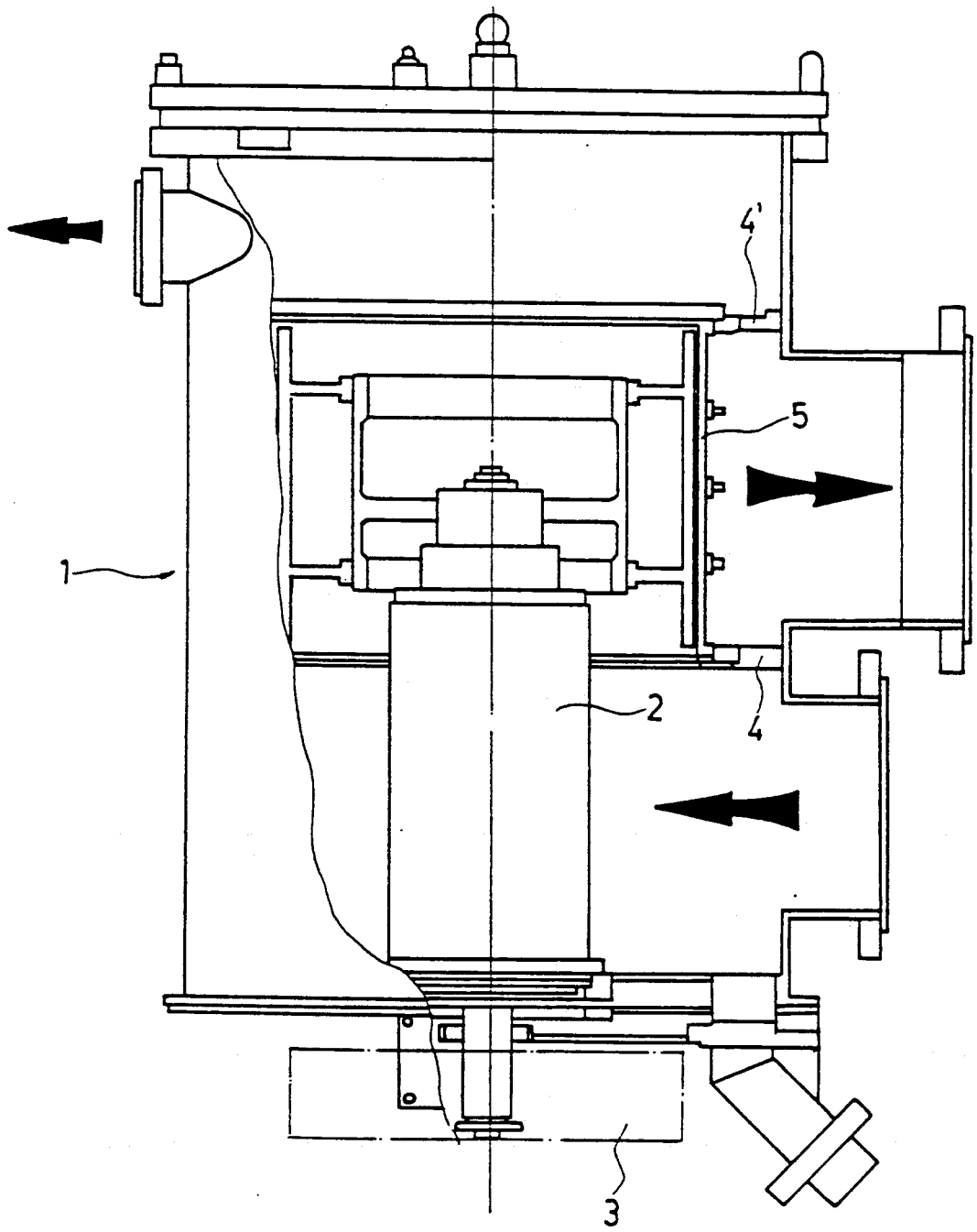
FIG. 1 is a sectional plane view of the prior screening machine.
Figure 2A:
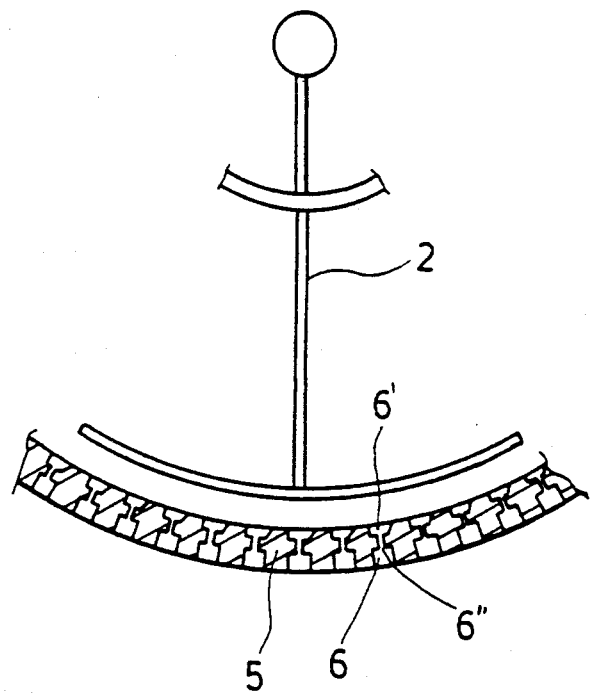
FIG. 2A is a cross-sectional view of the prior pulp screen in FIG. 2.
Figure 2:
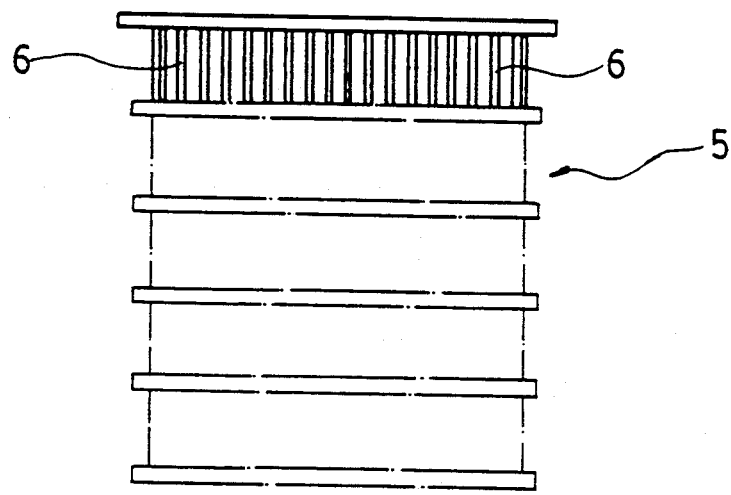
FIG. 2 is a sectional plan view of the prior pulp screen.

Each perforated plate (11) is formed with a plurality of parallel radial through-holes (12). Each through-hole (12) has a cross-section elongated in a direction transverse to a horizontal line and inclined at an angle with respect to a vertical line. Each through-hole (12) has a lower end (12a) and an upper end (12b). The lower end (12a) leads the upper end (12b), with respect to the rotating direction of the rotor (20) indicated by the arrow A. Each through-hole has an inner open end (120), an outer open end (121) and a constricted intermediate portion (122). Each through-hole gradually diverges from the constricted intermediate portion (122) to the outer open end (121). Each perforated plate (11) is made to form a cylinder and attached to two ring members (13). Then, a cylindrical screen member (5) as shown in FIG. 1 is made for screening the pulp smoothly.

Figure 4:
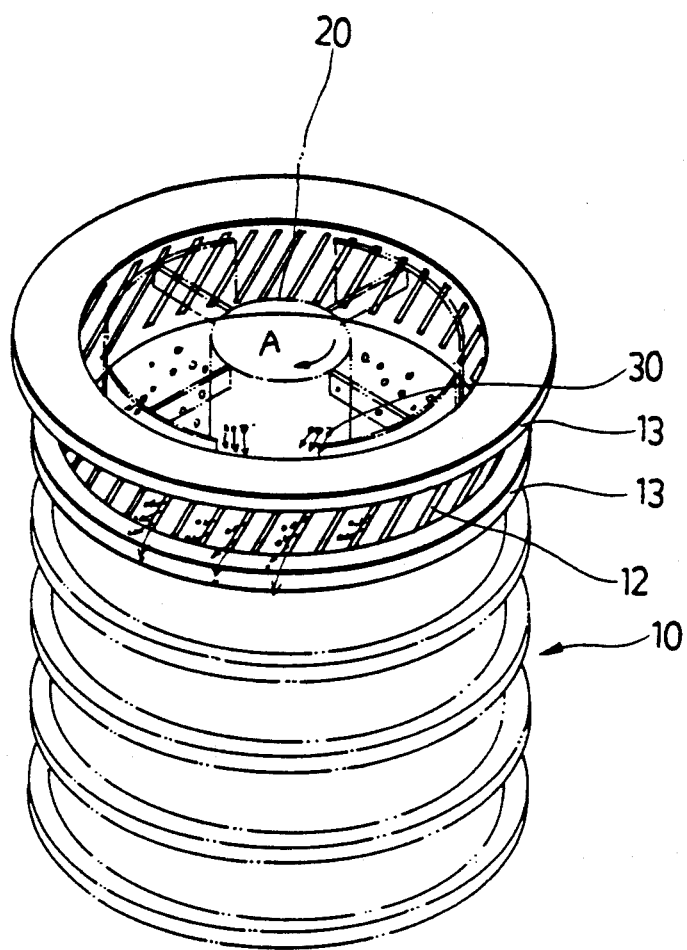
FIG. 4 is a operated sectional view of the preferred embodiment in FIG. 3.

Referring to FIG. 4, the rotor (20) rotates clockwise in a direction indicated by the arrow A. Therefore, owing to the orientation of the through-holes, the pulp particles (30) can linearly pass through the pulp screen. In addition each through-hole gradually diverges from the intermediate portion (122) to the outer open end (121) to further reduce the probability of clogging.

Figure 5A:
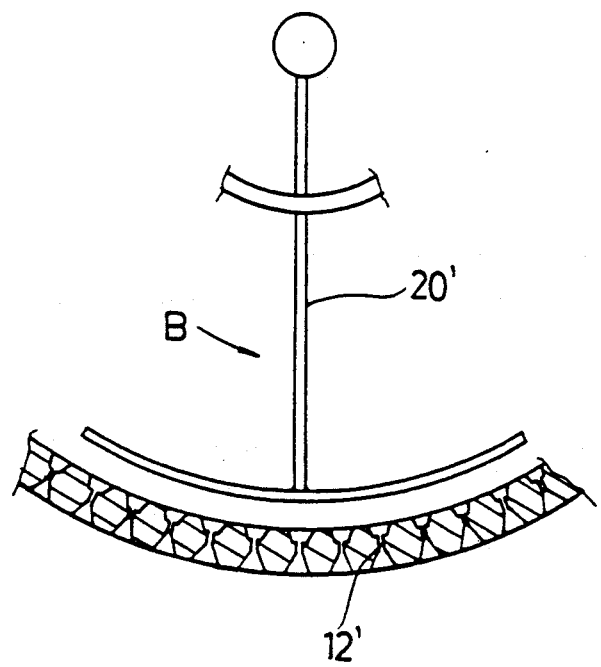
FIG. 5A is a sectional view of another preferred embodiment in FIG. 5.
Figure 5:
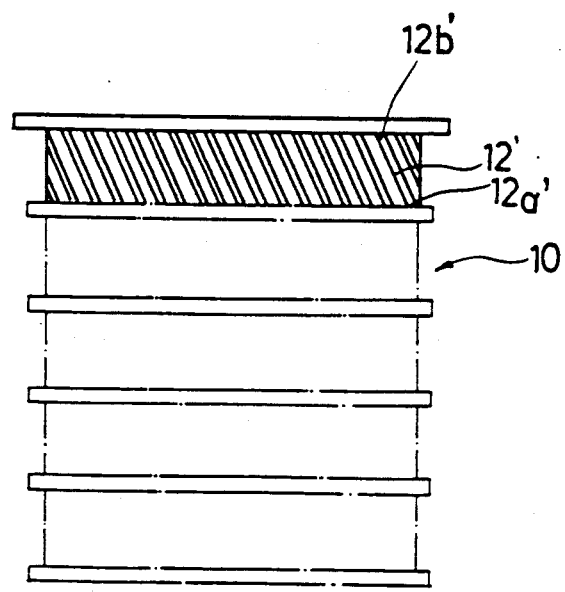
FIG. 5 is a sectional plan view of another preferred embodiment.

Referring to FIGS. 5 and 5A, a rotor (20') rotates anti-clockwise in a direction indicated by the arrow B. Each through-hole (12') of this embodiment, like the first preferred embodiment, has a lower end (12a') and an upper end (12b'), and the lower end (12a') leads the upper end (12b') corresponding to the anti-clockwise rotating direction of the rotor (20'). Such an arrangement of the through-holes of the screen member (10') facilitates the pulp flow as well as the first preferred embodiment.

Accordingly, the arrangement of the through-holes of the present invention decreases the likelihood of blockage and facilitates the outward flow of the pulp particles. Therefore, the flux of the pulp particles is increased and the power necessary to drive the rotor is economized.

With the invention thus explained, it is apparent that numerous modifications and variations can be made without departing from the scope of the invention. It is therefore intended that the invention be limited only as indicated in the appended claims.

I claim:

1. A centrifugal pulp screen including a vertical rotor, a cylindrical screen member around said rotor, said cylindrical screen member having a plurality of parallel radial through-holes located in separate parallel tiers, each of said through-holes has an inner end, an outer end, a constricted intermediate portion, and a cross-section elongated in a direction transverse to a horizontal line and inclined at an angle with respect to a vertical line, each of said through-holes further having a lower end and an upper end, said lower end leading said upper end with respect to the direction of rotation of said rotor.

2. A centrifugal pulp screen as claimed in claim 1, wherein each of said radial through-holes gradually diverges from said constricted intermediate portion to said outer open end.

* * * * *